US010635542B1

(12) United States Patent
Chandrashekhara et al.

(10) Patent No.: US 10,635,542 B1
(45) Date of Patent: Apr. 28, 2020

(54) SUPPORT FOR PROMPT CREATION OF TARGET-LESS SNAPSHOTS ON A TARGET LOGICAL DEVICE THAT HAS BEEN LINKED TO A TARGET-LESS SNAPSHOT OF A SOURCE LOGICAL DEVICE

(71) Applicant: EMC IP Holding Company LLC, Hopkinton, MA (US)

(72) Inventors: Sandeep Chandrashekhara, Shrewsbury, MA (US); Ning Wu, Northborough, MA (US); Michael Ferrari, Shrewsbury, MA (US); George Lettery, North Grafton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 237 days.

(21) Appl. No.: 15/496,462

(22) Filed: Apr. 25, 2017

(51) Int. Cl.
*G06F 11/14* (2006.01)
*G06F 3/06* (2006.01)

(52) U.S. Cl.
CPC .......... *G06F 11/1451* (2013.01); *G06F 3/065* (2013.01); *G06F 3/067* (2013.01); *G06F 3/0619* (2013.01); *G06F 3/0665* (2013.01); *G06F 11/1435* (2013.01); *G06F 11/1464* (2013.01); *G06F 2201/84* (2013.01)

(58) Field of Classification Search
CPC .... G06F 11/1451; G06F 3/0619; G06F 3/065; G06F 3/067
See application file for complete search history.

(56) References Cited

U.S. PATENT DOCUMENTS

| 5,206,939 A | 4/1993 | Yanai et al. |
|---|---|---|
| 5,778,394 A | 7/1998 | Galtzur et al. |
| 5,845,147 A | 12/1998 | Vishlitzky et al. |
| 5,857,208 A | 1/1999 | Ofek |
| 7,340,489 B2 | 3/2008 | Vishlitsky et al. |
| 7,779,291 B2 | 8/2010 | Yoder et al. |
| 9,383,942 B2 * | 7/2016 | Ezra ............... G06F 3/0614 |
| 10,185,505 B1 * | 1/2019 | Golden ............. G06F 3/0665 |
| 2006/0047926 A1 * | 3/2006 | Zheng .............. G06F 3/0608 711/162 |
| 2010/0023716 A1 * | 1/2010 | Nemoto ............ G06F 11/1451 711/162 |

* cited by examiner

*Primary Examiner* — Larry T Mackall
*Assistant Examiner* — Michelle T Bechtold
(74) *Attorney, Agent, or Firm* — BainwoodHuang

(57) ABSTRACT

To allow prompt creation of a target-less snapshot of a target logical volume, after the target logical volume has been linked to a target-less snapshot to allow host access to the target-less snapshot, and prior to all the tracks of the target logical volume being defined with regard to data from the target-less snapshot, a target device sequence number is maintained for the target logical volume, and incremented each time a target-less snapshot is linked to the target logical volume. A target track sequence number is maintained for each track of the target logical volume, and updated each time target-less snapshot data is moved to the corresponding track. The target device sequence number and target track sequence numbers are compared prior to performing host I/O operations directed to the target logical volume to ensure data correctness on a track by track basis.

20 Claims, 12 Drawing Sheets

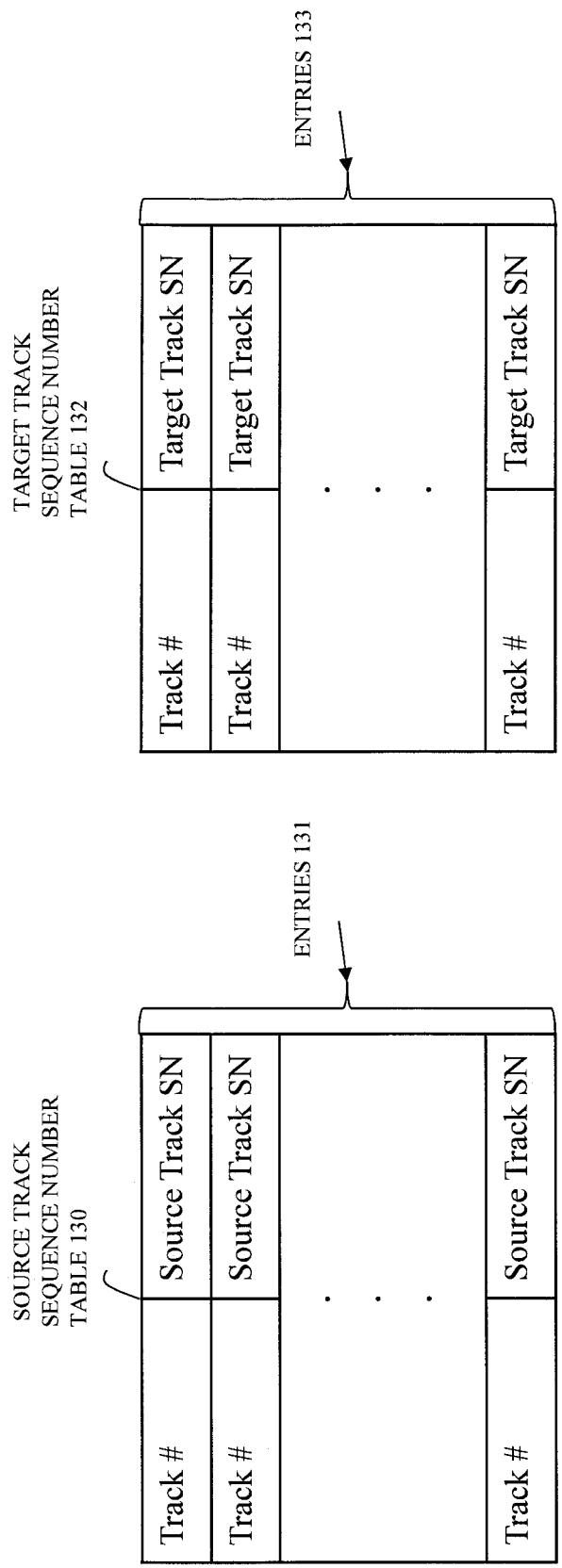

SUPPORT FOR PROMPT CREATION OF TARGET-LESS SNAPSHOTS ON A TARGET LOGICAL DEVICE THAT HAS BEEN LINKED TO A TARGET-LESS SNAPSHOT OF A SOURCE LOGICAL DEVICE

TECHNICAL FIELD

The present disclosure relates generally to intelligent data storage systems, and more specifically to technology that enables a target-less snapshot to be created of a target logical device that has been linked to a target-less snapshot of a source logical device without requiring that the target logical device be completely defined with regard to all the tracks of the target-less snapshot of the source logical device.

BACKGROUND

Data storage systems are arrangements of hardware and software that typically include or are coupled to non-volatile data storage devices, such as magnetic disk drives, electronic flash drives, and/or optical drives. Some data storage systems include host interface units (host adapters), disk drives, and disk interface units (disk adapters). A host device ("host"), such as a server computer, desktop computer, laptop computer, or mobile computing device, accesses the data storage of the storage devices in a data storage system by way of host I/O operations that are sent from the host device and received by the data storage system, e.g. through one or more communication channels to the data storage system. The host I/O operations do not address the storage devices of the data storage system directly, but instead access logical volumes of storage that are sometimes referred to as logical disks or "LUNs". Each logical volume is made up of equal size units of host addressable storage space referred to as "tracks", each of which may be mapped to a corresponding physical track on one of the non-volatile data storage devices, such as a physical track of disk drive, and into which the host data directed to the track of the logical volume is ultimately stored.

Data storage systems have sometimes created point in time copies of logical volumes referred to as "snapshots". A snapshot may be created periodically for a logical volume in response to a snapshot timer, and/or in response to a snapshot request received from a host. In order to reduce the overhead required when a snapshot is created, including the overhead resulting from assigning a specific "target" logical volume to a snapshot at the time the snapshot is created, some data storage systems have provided "target-less" snapshots. Target-less snapshots collect the data for a point in time copy of the logical volume for which they are created, but are not initially associated with any target logical volume that can be accessed by a host. Subsequently, when a host requests access to a target-less snapshot, the target-less snapshot must be linked to a target logical volume that can be accessed by the host, so that subsequent accesses by the host to the tracks of the target logical volume provide access to the data in the target-less snapshot, thus allowing the host to access the target-less snapshot through the target logical volume in a conventional manner at the time access to the target-less snapshot is required, while also allowing creation of the target-less snapshot to be performed efficiently without assigning a target logical volume to the target-less snapshot at the time the target-less snapshot is created.

SUMMARY

Previous data storage systems have exhibited significant shortcomings with regard to creating target-less snapshots of a logical volume after the logical volume has been linked to a target-less snapshot. After a target-less snapshot is linked to a logical volume, the logical volume becomes a target logical volume, and all tracks of the target logical volume have previously been required to be defined with data of the target-less snapshot prior to the creation of a snapshot of the target logical volume. For example, in some previous systems, each track of the target logical volume would have to be made to contain data of the target-less snapshot by either i) copying the data of the corresponding track of the target-less snapshot to a physical track of a storage device that is allocated to ultimately store the data written to the track of the target logical volume, or ii) setting up a pointer in a mapping table for the track of the logical volume indicating a physical track of a physical storage device on which the data written to the corresponding track of the target-less snapshot is stored. In either case, defining all of the tracks of the target logical volume with regard to the data of the target-less snapshot may require a significant period of time, up to minutes or even hours for very large logical volumes. Preventing snapshots from being created of a target logical device during such a lengthy time period is a significant shortcoming, since snapshot creation timers may expire, or host issued snapshot creation requests may be received for the target logical volume during that time period. In such cases, a snapshot of the target logical device cannot be created, and the requested snapshot creation operation fails.

To address the above described and other shortcomings of previous data storage system technologies, new data storage technologies are disclosed herein for allowing a target-less snapshot to be created of a target logical volume, after the target logical volume has been linked to a target-less snapshot, and prior to all the tracks of the target logical volume being defined with regard to data from the target-less snapshot. In the disclosed technology, a target device sequence number is maintained for the target logical volume. The target device sequence number for the target logical volume is incremented each time a target-less snapshot is linked to the target logical volume. Target track sequence numbers are also maintained for the tracks of the target logical volume, such that a target track sequence number is associated with each one of the tracks in the target logical volume. Maintaining each of the target track sequence numbers for the target logical volume includes updating the target track sequence number each time target-less snapshot data is moved to the corresponding track of the target logical volume.

In response to receipt of a write operation from a host device that is directed to a track within the target logical volume, the target track sequence number corresponding to the track to which the write operation is directed is compared with the target device sequence number for the target logical volume. In response to detecting that the target track sequence number corresponding to the track to which the write operation is directed is less than the target device sequence number for the target logical volume, and prior to performing the write operation, the storage system i) moves data of a target-less snapshot of a source logical volume to the track in the target logical volume to which the host write operation is directed (e.g. by copying the data of the target-less snapshot or writing a pointer to the data of the track of the target-less snapshot into a mapping table for the target logical volume), and ii) updates the target track sequence number corresponding to the track to which the write operation is directed (e.g. to match the current value of the target device sequence number for the target logical volume).

In another aspect of the disclosed technology, a source device sequence number may be maintained for the target logical volume. The source device sequence number for the target logical volume is incremented each time a target-less snapshot is created of the target logical volume. Source track sequence numbers may also be maintained for the target logical volume, such that a source track sequence number is associated with each one of the tracks in the target logical volume. Each source track sequence number is updated (e.g. set to the current value of the source device sequence number for the target logical volume) each time a pointer to data copied from the corresponding track of the target logical volume is stored into a replication pointer data structure that represents target-less snapshots created of the target logical volume.

In another aspect of the disclosed technology, further in response to receipt of the write operation, and subsequent to moving the data of the target-less snapshot of the source logical volume to the track within the target logical volume to which the host write operation is directed, a source track sequence number corresponding to the track within the target logical volume to which the write operation is directed is compared with the source device sequence number for the target logical volume. In response to detecting that the source track sequence number corresponding to the track within the target logical volume to which the write operation is directed is less than the source device sequence number for the target logical volume, and prior to performing the host write operation, the storage system i) copies data from the track to which the host write operation is directed to a portion of a data pool, ii) stores a pointer to the portion of the data pool into which the data from the track within the target logical volume was copied into a replication pointer data structure that represents target-less snapshots created of the target logical volume, and iii) updates the source track sequence number corresponding to the track to which the write operation is directed.

After the storage system has, in response to detecting that the target track sequence number corresponding to the track to which the write operation is directed is less than the target device sequence number for the target logical volume, moved data of a target-less snapshot of a source logical volume to the track in the target logical volume to which the host write operation is directed and updated the target track sequence number for the track, and has also, in response to detecting that the source track sequence number corresponding to the track within the target logical volume to which the write operation is directed is less than the source device sequence number for the target logical volume, copied data from the track to which the host write operation is directed to a portion of a data pool and updated the source track sequence number for the track, the host write operation can be safely performed, even in the case where a target-less snapshot has been taken of the target logical volume after the target logical volume has been linked to a target-less snapshot of a source logical volume, and before all the tracks of the target logical volume have been defined with data from the target-less snapshot of the source logical volume to which the target logical volume has been linked.

In another aspect of the disclosed technology, the target-less snapshot of the source logical volume is created as a point in time copy of the source logical volume, and the target-less snapshot of the source logical volume is not host accessible at the time it is created.

In another aspect of the disclosed technology, subsequent to the creation of the target-less snapshot of the source logical volume, the target-less snapshot of the source logical volume is linked to the target logical volume, and linking the target-less snapshot of the source logical volume to the target logical volume makes the target-less snapshot of the source logical volume accessible to a host device through host I/O operations directed to the target logical volume. In response to the linking of the target-less snapshot of the source logical volume to the target logical volume, the storage system increments the device target sequence number for the target logical volume.

In another aspect of the disclosed technology, in response to the linking of the target-less snapshot of the source logical volume to the target logical volume, the storage system causes a background process to begin moving data of the target-less snapshot of the source logical volume to the tracks of the target logical volume. Subsequent to the linking of the target-less snapshot of the source logical volume to the target logical volume, and prior to the background process moving data of the target-less snapshot of the source logical volume to all the tracks of the target logical volume, a snapshot of the target logical volume that is a point in time copy of the target logical volume may be created. In the case where such a target-less snapshot of the target logical volume is created, the storage system increments the source device sequence number for the target logical volume in response to the creation of snapshot of the target-less snapshot of the target logical volume.

In another aspect of the disclosed technology, the background process may further operate by updating the target track sequence number corresponding to each track in the target logical volume to which it moves data of the target-less snapshot of the source logical volume.

In another aspect of the disclosed technology, a target-less snapshot of the source logical volume may be created as a point in time copy of the source logical volume, and the target-less snapshot of the source logical volume may be restored by linking the target-less snapshot of the source logical volume to the same source logical volume, while simultaneously allowing another target-less snapshot of the source logical volume to be created while the restoration of the source logical volume to the previous target-less snapshot is still in progress.

Embodiments of the disclosed technology may provide significant advantages over previous technical solutions. The disclosed technology effectively provides the ability for a data storage system to create a snapshot of a target logical volume after the target logical volume has been linked to a target-less snapshot of a source logical volume, and before all tracks of the target logical volume are defined with regard to the data of the target-less snapshot, and while providing host access to the target logical volume. By allowing snapshots to be taken of a target logical device during this time period, the disclosed technology avoids problems resulting from failed snapshot operations that would otherwise occur when a snapshot timer expired or a host snapshot request indicated a time creation time prior to all the tracks of the target logical volume being defined to the data of the target-less snapshot. In this way the disclosed technology allows for more frequent and consistently time snapshot creation, thus providing hosts with improved options with regard to data protection and recovery functionality.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 8A is a block diagram showing an example of a source track sequence number table that may be used in some embodiments of the disclosed technology;

FIG. 8B is a block diagram showing an example of a target track sequence number table that may be used in some embodiments of the disclosed technology;

DETAILED DESCRIPTION

Embodiments of the invention will now be described. It should be understood that the embodiments described below are provided only as examples, in order to illustrate various features and principles of the invention, and that the invention is broader than the specific embodiments described below.

Figure 1:
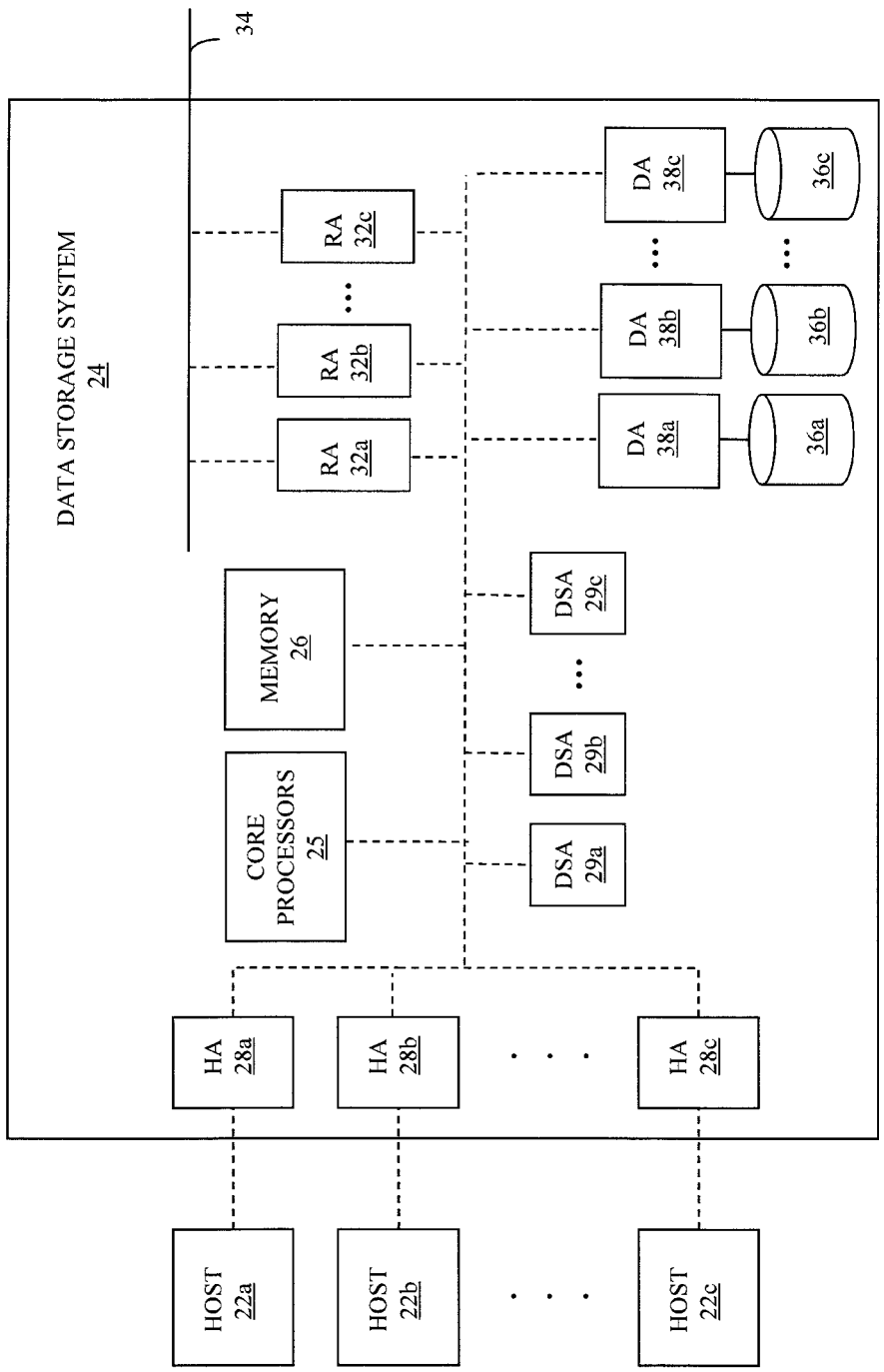
FIG. 1 is a block diagram showing an operational environment for the disclosed techniques, including a number of host devices and an example of a data storage system in which the disclosed techniques may be embodied.

FIG. 1 shows Hosts 22a-22c coupled to a Data Storage System 24 that may be used in connection with an embodiment of the disclosed technology. Each of the Hosts 22a-22c may be located at the same physical site or may be located in different physical sites, and may be coupled to the Data Storage System 24 using SCSI, Fibre Channel, iSCSI, etc. The Data Storage System 24 includes a Memory 26 operable to store program code and data that facilitates operation of the Data Storage System 24, as further described elsewhere herein. The Data Storage System 24 includes multiple host adapters (HA's) 28a-28c that handle reading and writing of data between the Hosts 22a-22c and the Data Storage System 24. Although FIG. 1 shows each of the Hosts 22a-22c coupled to an individual one of the HA's 28a-28c, it will be appreciated by one of ordinary skill in the art that one or more of the HA's 28a-28c may be coupled to other hosts.

In some embodiments, the Data Storage System 24 may include one or more Remote Data Facility (RDF) adapter units (RA's) 32a-32c, which may be used to copy data from one data storage system to another data storage system. For example, if a host writes data to a first data storage system (e.g., a local data storage system), it may be desirable to copy that data to a second data storage system in a physical different location (e.g., a remote data storage system). The RA's 32a-32c are coupled to an RDF link 34 and are similar to the HA's 28a-28c, but are used to transfer data between Data Storage System 24 and other data storage systems that are also coupled to the RDF link 34. The Data Storage System 24 may be coupled to additional RDF links (not shown) in addition to the RDF link 34.

The Data Storage System 24 includes or is coupled to one or more non-volatile data storage devices, such as magnetic disk drives, electronic flash drives, and/or optical drives, shown for purposes of illustration in FIG. 1 by Disks 36a-36c. Each one of Disks 36a-36c may contain a portion of the host data that is stored by the Data Storage System 24. Each of the Disks 36a-36c may be coupled to a corresponding one of multiple disk adapter units (DA's) 38a-38c that provides data to and receives data from a corresponding one of the Disks 36a-36c. In some embodiments, more than one disk may be serviced by a given DA, and more than one DA may service a given disk. The term "data" as used herein to describe the host data stored by Data Storage System 24 may, in various embodiments, include data files, extents, blocks, chunks and/or other designations that indicate a unit, segment or collection of data.

The Data Storage System 24 further includes a number of data services adapters (DSA's) 29a-29c located between HA's 22a-22c and the DA's 38a-38c, that may operate to provide, in whole or in part, the functions, steps, or processes of the disclosed technology, and that may generally operate to reduce I/O path latency and provide scalability. In some embodiments, DSA's 29a-29c may simplify the design of the HA's 22a-22c and DA's 38a-38c, e.g. by performing various non-I/O specific operations.

In some embodiments, each one of the DSA's 29a-29c, each one of the HA's 28a-28c, each one of the RA's 32a-32c, and each one of the DA's 36a-36c, may include or consist of program code that executes on processing circuitry, e.g. as one or more separate threads executing on one or more microprocessors that are assigned or allocated from Core Processors 25, and that is assigned to and/or is stored in some portion of local memory within the Data Storage System 24 (e.g. Memory 26).

The host addressable storage space that is provided by Data Storage System 24 to Hosts 22a-22c, and that is mapped by Data Storage System 24 to physical non-volatile storage allocated from Disks 36a-36c, may be subdivided into multiple logical devices (e.g. "LUNs") that are each accessible to one or more of the Hosts 22a-22c, and that are referred to herein for purposes of explanation as "logical volumes". An individual logical volume may or may not correspond to, and/or be mapped to, the physical storage space of a single corresponding storage drive in Disks 36a-36c. Thus, for example, a single physical storage device such as Disk 36a may provide physical storage to ultimately store host data that is written by one or more of Hosts 22a-22c to multiple different logical volumes. Alternatively, host data that is written by one or more of Hosts 22a-22c to a single logical volume may ultimately be stored across multiple physical storage devices, e.g. on Disk 36a and Disk 36b. Hosts 22a-22c may access any combination of logical volumes provided by Data Storage System 24, independently from and without knowledge of the specific locations of the portions of physical storage in Disks 36a-36c that are used by Data Storage System 24 to store the host data written to those logical volumes.

In some embodiments, the logical volumes provided by Data Storage System 24 to Hosts 22a-22c may have a size or capacity that is expressed in terms of physical device geometry. For example, in some embodiments each logical volume may be accessed by Hosts 22a-22c based on equal size units of host addressable storage space provided by the logical volume that are referred to as "tracks". Each track of a logical volume may be mapped by Data Storage System 24 to a corresponding physical track on one of the Disks 36a-36c, such as a physical track of hard disk drive, and into which the host data written to the track of the logical volume is ultimately stored by Data Storage System 24. In this way, Hosts 22a-22c may direct I/O operations to specific locations within a logical volume by specifying both a name or other identifier of the logical volume, and also an offset or index indicating a specific track or tracks within the logical volume to be accessed by the I/O operation (e.g. to be written or read).

One or more internal logical data path(s) exist between the DA's 38a-38c, the DSA's 29a-29c, the HA's 28a-28c, the RA's 32a-32c, the Core Processors 25, and the Memory 26. In some embodiments, one or more internal buses and/or communication modules may be used. In some embodiments, Memory 26 may be used to facilitate data transferred between the DA's 38a-38c, the DSA's 29a-29c, the HA's 28a-28c and the RA's 32a-32c. The Memory 26 may contain tasks or threads that are to be performed by one or more of the DA's 38a-38c, DSA's 29a-29c, the HA's 28a-28c and the RA's 32a-32c, and a cache for data fetched from one or more of the Disks 36a-36c. The Data Storage System 24 may be provided as a stand-alone device that is communicably coupled to the Hosts 22a-22c over one or more computer networks, such as a local area network (LAN), wide area network (WAN), etc. Alternatively, the Data Storage System 24 may be part of, and/or otherwise coupled to, a storage area network (SAN) that may include one or more other data storage systems, as well as switches, routers, network connections, etc.

Figure 2:
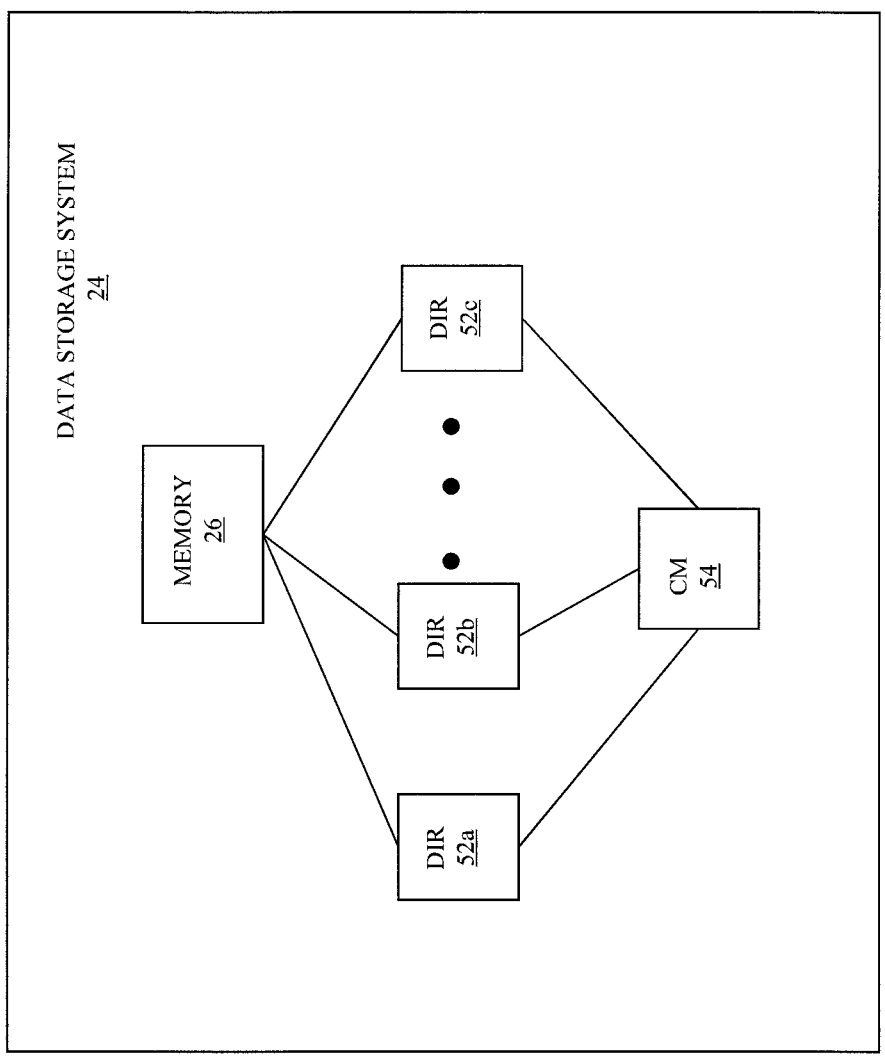
FIG. 2 is a block diagram showing a storage system, memory, a number of directors, and a communication module according to some embodiments of the disclosed technology.

FIG. 2 illustrates an embodiment of the Data Storage System 24 in which each of multiple Directors 52a-52c are communicably coupled to the Memory 26. Each of the Directors 52a-52c may represent one of the HA's 28a-28c, DSA's 29a-29c, RA's 32a-32c, and/or DA's 38a-38c of FIG. 1. In some embodiments, there may be up to sixty four directors coupled to the Memory 26. In other embodiments, there may be a higher or lower numbers of directors.

FIG. 2 also shows an optional communication module (CM) 54 that provides an alternative communication path between the Directors 52a-52c. Each one of the Directors 52a-52c may be coupled to the CM 54, so that any one of the Directors 52a-52c may send a message and/or data directly to any other one of the Directors 52a-52c without needing to go through the Memory 26. The CM 54 may be implemented using conventional MUX/router technology, by which a sending one of the Directors 52a-52c provides an appropriate address to cause a message and/or data to be received by an intended receiving one of the Directors 52a-52c. Some or all of the CM 54 may be implemented using one or more of the Directors 52a-52c so that, for example, the Directors 52a-52c may be interconnected directly with the interconnection being provided within each one of the Directors 52a-52c. In addition, a sending one of the Directors 52a-52c may be able to broadcast a message to all of the other Directors 52a-52c at the same time.

In some embodiments, one or more of the Directors 52a-52c may include or be allocated or assigned multiple microprocessors and thus may be able to perform operations for multiple directors. In some embodiments, at least one of the Directors 52a-52c having multiple processor systems thereon or assigned thereto may simultaneously perform the functions of at least two different types of directors (e.g., of both an HA and a DA). Furthermore, in some embodiments, at least one of the Directors 52a-52c having multiple processor systems thereon or assigned thereto may simultaneously perform the functions of at least one type of director and perform other processing with the other processing system. In some embodiments, Memory 26 may be a global memory, at least part of which may be provided on one or more of the Directors 52a-52c, and/or shared with other ones of the Directors 52a-52c. In some embodiments, the Memory 26 may be part of a global memory that is distributed across multiple data storage systems, and may be accessible by each one of the multiple data storage systems.

Although examples of specific data storage system configurations are described above with reference to FIG. 1 and FIG. 2, it should be understood that the technologies disclosed herein may be embodied on any appropriate platform. Thus, the technologies disclosed herein may be embodied in whole or in part using a platform like that described above with reference to FIG. 1 and FIG. 1, or alternatively may be embodied using a different platform.

Figure 3:
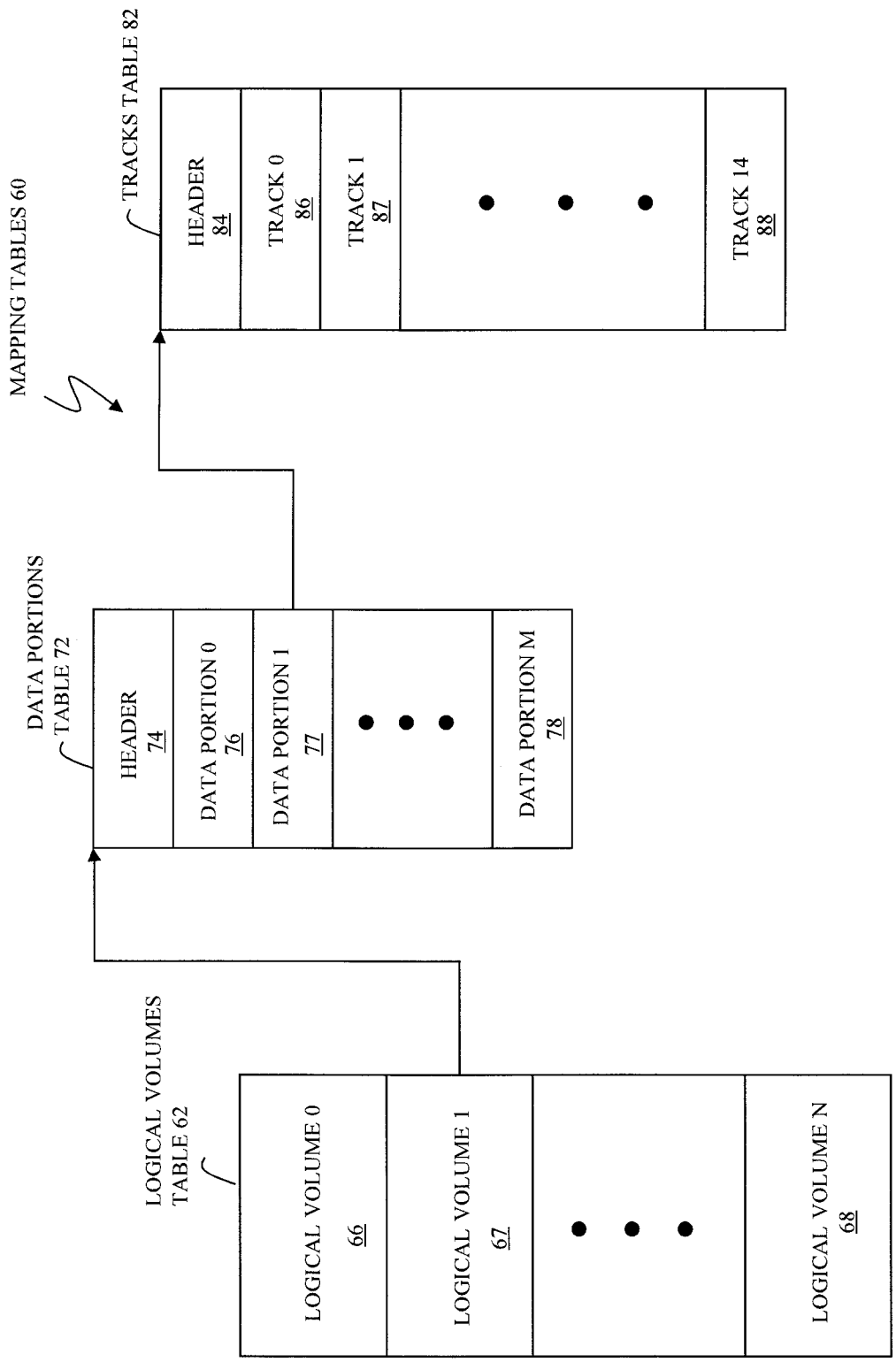
FIG. 3 is a block diagram showing an example of device tables used in some embodiments of the disclosed technology.

FIG. 3 shows an example of Mapping Tables 60 that may be used to map logical address space of logical volumes provided by the Data Storage System 24 to physical storage space in Disks 36a-36c. Mapping Tables 60 may, for example, be stored in Memory 26. Logical Volume Table 62 includes an entry for each logical volume provided by Data Storage System 24 to Hosts 22a-22c. Specifically, Logical Volumes Table 62 includes logical volume entries 66-68, each one of which corresponds to one of the logical volumes provided by Data Storage System 24, or alternatively to a portion of a logical volume provided by Data Storage System 24. Each entry in Logical Volumes Table 62 may include a description of the corresponding logical volume, which may be a standard logical volume, or a thin logical volume.

As further shown in FIG. 3, each one of the entries 66-68 in Logical Volumes Table 62 indicates a data portion table that contains information for data portions of the logical volume corresponding to that entry in Logical Volumes Table 62. For example, the entry 67 for Logical Volume 1 may correspond to a Data Portions Table 72 for Logical Volume 1. Data Portions Table 72 includes a header that contains various types of overhead information regarding Logical Volume 1. Data Portions Table 72 also includes entries 76-78 for separate contiguous portions of the host accessible address space of Logical Volume 1 (e.g., where each portion is equal is equal in size to a cylinder, or to some other group of tracks in a physical storage device). In some embodiments, the specific number of data portions that a virtual volume contains is configurable, and may depend on how the logical volume is initialized. In other embodiments, each virtual volume contains a fixed number of data portions.

Each of the data portion entries 76-78 corresponds to a tracks table. For example, the entry 77 for Data Portion 1 may indicate a Tracks Table 82 for Data Portion 1 that includes a Header 84 that contains various types of overhead information regarding Data Portion 1 of Logical Volume 1. Tracks Table 82 also includes entries 86-88 for each of the tracks in Data Portion 1 of Logical Volume 1. For example, in some embodiments, each contiguous data portion of a logical volume may include fifteen tracks. However, other embodiments may have different numbers of tracks within each of the data portions, or even a variable number of tracks within each data portion. For standard logical devices, the information in each of the entries 86-88 includes a pointer (either direct or indirect) to a physical location on one of the Disks 36a-36c of the Data Storage System 24 (or a remote data storage system if the system is so configured). Thus, Tracks Table 82 maps logical addresses within Data Portion 1 of Logical Volume 1 to physical addresses of tracks on the Disks 36a-36c of the Data Storage System 24.

The Mapping Tables 60 of FIG. 3 may be stored in the Memory 26 of Data Storage System 24 and/or may otherwise be stored in non-volatile memory (i.e., within a physical storage device). In some embodiments, mapping tables corresponding to logical volumes accessed by a particular host may be stored in local memory of the corresponding one of the HA's 28a-28c. In some embodiments, the RA's 32a-32c, DSA's 29a-29c, and/or the DA's 38a-38c may also use and locally store portions of the Mapping Tables 60.

Figure 4:
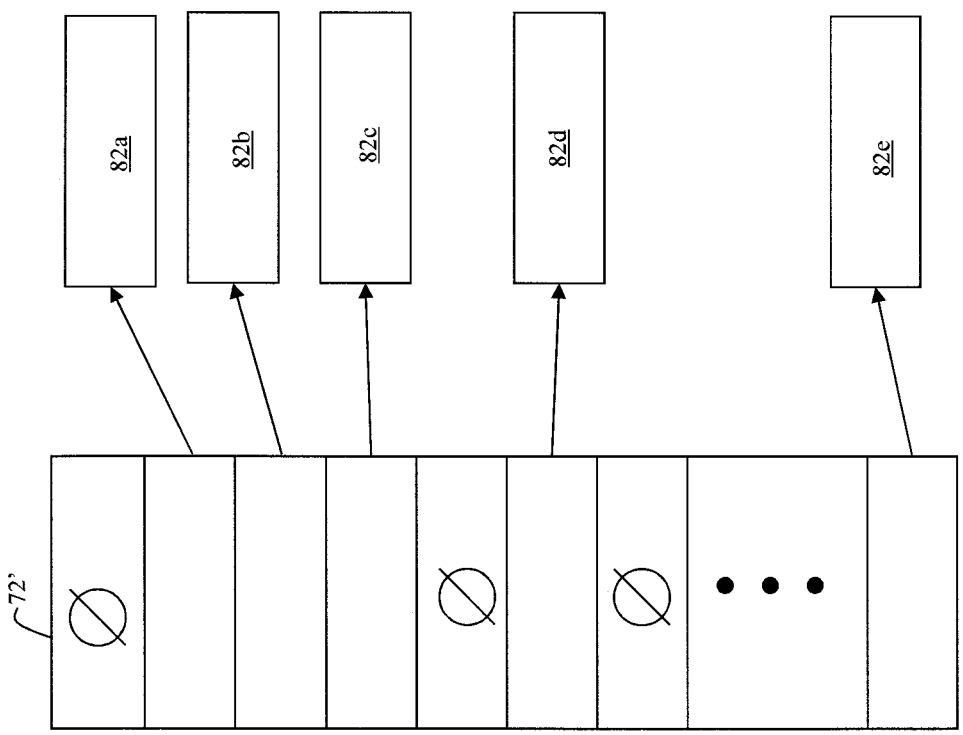
FIG. 4 is a block diagram showing an example of a table that may be used for a thin logical volume used in some embodiments of the disclosed technology.

FIG. 4 shows an example of a Data Portions Table 72' for a thin logical volume. Data Portions Table 72' is shown including some null pointer entries, which do not point to tracks tables. Data Portions Table 72' also includes some non-null pointer entries that, similar to the entries for the Data Portions Table 72 discussed above, each point to one of the Tracks Tables 82a-82e. The thin logical volume provided by Data Storage System 24 to the Hosts 22a-22c appears to Hosts 22a-22c to have a particular amount of host addressable logical volume storage capacity, while Data Storage System 24 has actually allocated only a smaller amount of physical storage from the Disks 36a-36c to the thin logical volume. When the thin logical volume represented by Data Portions Table 72 is initialized, all (or at least most) of the entries in Data Portions Table 72' are set to null, indicating that physical storage has not been allocated for those data portions of the thin logical volume. Physical storage resources may be allocated for particular data portions of the logical volume as data is written by the Hosts 22a-22c to those particular data portions. If data is not written to a given data portion of the thin logical volume, the corresponding entry in the table 72' maintains the null pointer that was written at initialization.

Figure 5A:
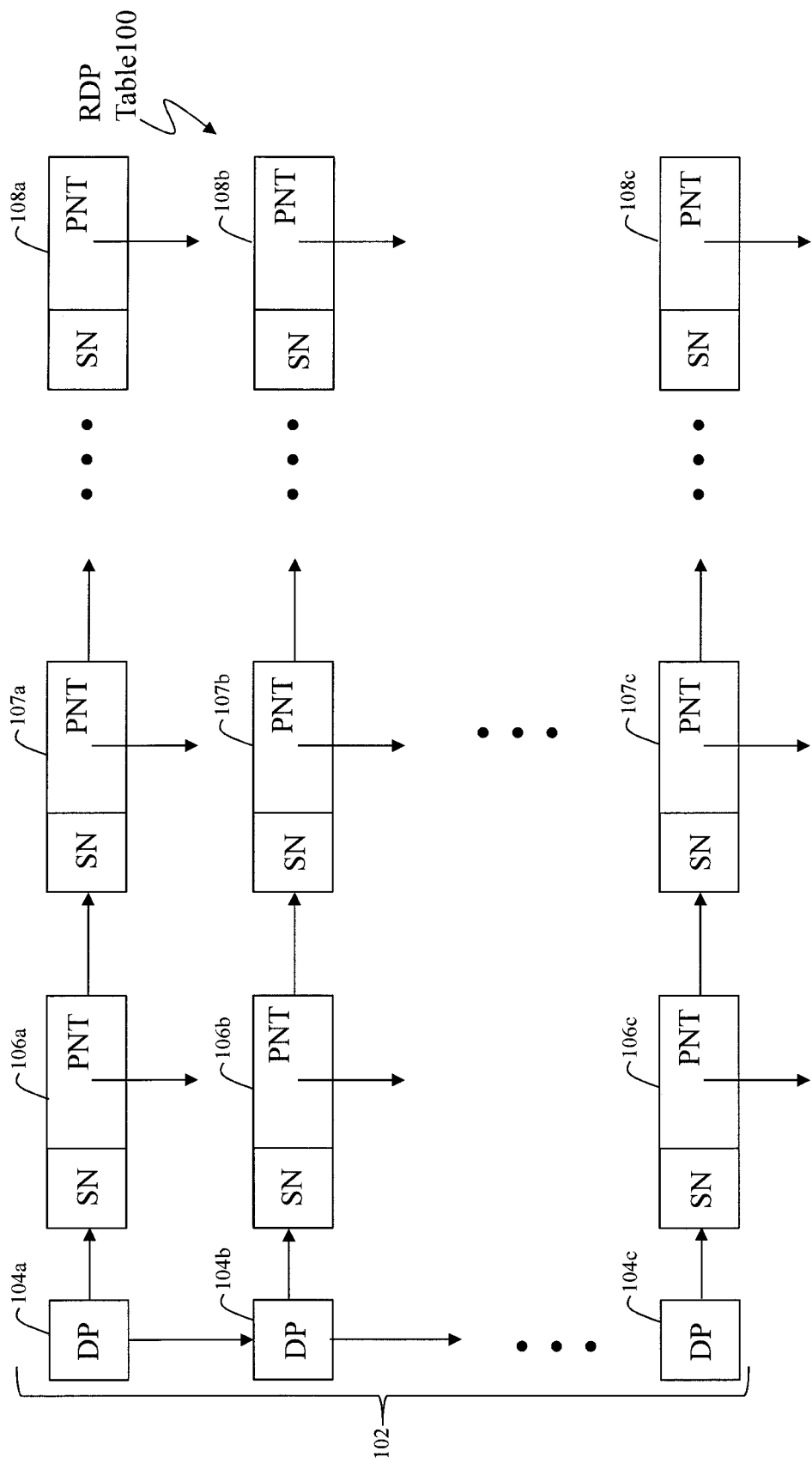
FIG. 5A is a block diagram showing an example of a replication data pointer table that may be used as a replication data pointer data structure in some embodiments of the disclosed technology.

FIG. 5A shows an example of a Replication Data Pointers ("RDP") Table 100 that includes a first linked list 102 having entries 104a-104c that each correspond to a data portion of a logical volume that is associated with RDP Table 100. The RDP Table 100 is an example of a replication data pointer data structure that may be used to maintain pointers to copies of tracks of data that are part of one or more target-less snapshots created of the associated logical volume. In this way RDP Table 100 is an example of a replication pointer data structure that represents target-less snapshots created of an associated logical volume.

Each of the entries 104a-104c corresponds to a contiguous portion of the host addressable address space of the logical volume. The associated logical volume may be a standard logical volume with all of the data portions having corresponding physical data storage allocated thereto, or may be a thin logical volume, as described above.

Each of the data portion entries 104a-104c corresponds to one or more table entries that are maintained using an appropriate data structure, such as a linked list. The data portion entry 104a corresponds to a plurality of table entries 106a-108a, the data portion entry 104b corresponds to a plurality of table entries 106b-108b, and the data portion entry 104c corresponds to a plurality of table entries 106c-108c. Note that, although RDP Table 100 is shown for purposes of concise illustration having data portion entries 104a-104c each having three table entries, the RDP Table 100 may contain any number of data portion entries, each one of which may have any number of table entries. In some cases, it is possible for there to be no data portion number or corresponding table entries associated with a particular data portion of a logical volume. Each of the table entries 106a-108c includes a source device sequence number and a pointer to storage. The storage pointer in a given one of the table entries 106a-108c indicates the storage (e.g. in Data Pool 111) in which is stored the data for the corresponding data portion of the logical volume for a target-less snapshot that was created of the logical volume when a source device sequence number of the logical volume was equal to the sequence number stored in the entry. For example, the pointer in a given one of the table entries 106a-108c may consist of or include a pointer to a portion of the Data Pool 111 into which data from a track within the logical volume was copied when a host write I/O operation directed to that track was received at a time when the source track sequence number for the track was less than the source device sequence number for the logical volume, and the sequence number for the entry may be the source track sequence number for the track at the time the host I/O operation was received.

Figure 5B:
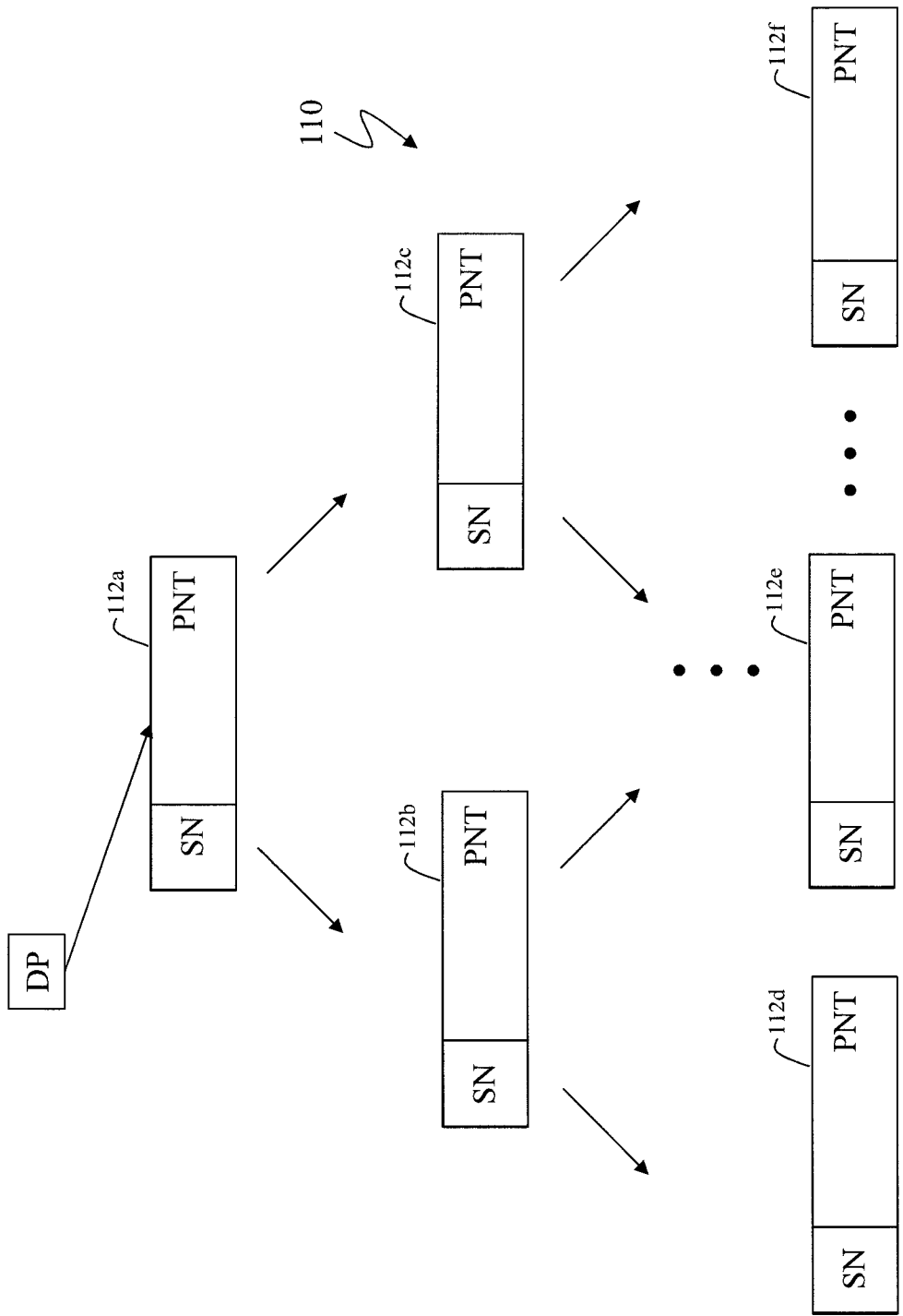
FIG. 5B is a block diagram showing an example of a replication data pointer tree that may be used as a replication data pointer data structure in some embodiments of the disclosed technology.

FIG. 5B shows an example of a Replication Data Pointers ("RDP") Tree 110 that includes multiple nodes 112a-112f. The RDP Tree 110 is another example of a replication data pointer data structure that may be used to maintain pointers to physical tracks of data that are part of one or more target-less snapshots created of the associated logical volume. In this way RDP Tree 110 is another example of a replication pointer data structure that represents target-less snapshots created of an associated logical volume.

In the example of FIG. 5B, DP consists of or includes a pointer to the root node of the RDP Tree 110, and the RDP Tree 100 indicates or contains older versions of data for a specific track of an associated logical volume. In some embodiments, and as shown in the example of FIG. 5B, each track of the logical volume has its own tree, just as each track had its own linked list in the example of FIG. 5A. Each of the tree nodes 112a-112f includes a data portion indicator, a count of the number of target-less snapshots that share the node, a sequence number, and a pointer to storage. The data portion indicator indicates a portion of the host addressable address space of the logical device corresponding to the particular one of the tree nodes 112a-112f. The count of the number of snapshots indicates the number of target-less snapshots that share the data indicated by the pointer to storage in the node. The sequence number and the pointer to physical storage are similar to the sequence number and pointer to storage described above with reference to the entries of the RDP Table 100. In some embodiments, the RDP Tree 110 is a balanced binary tree ordered according to sequence number.

Figure 6:
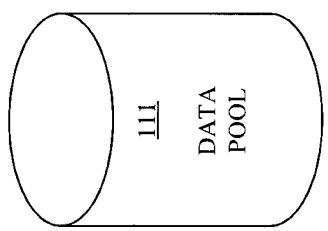
FIG. 6 is a diagram showing an example of a data pool that may be used in some embodiments of the disclosed technology.

FIG. 6 illustrates a Data Pool 111 that provides storage for data that is moved in connection with maintaining target-less snapshots. Portions of the data stored in the Data Pool 111 pointed to by the pointers provided by the table entries 106a-108c or the tree nodes 112a-112f. In some embodiments, the Data Pool 111 may be provided in a single logical volume and/or physical storage drive in Data Storage System 24. In other embodiments, Data Pool 111 may be distributed across more than one logical volume and/or physical storage drive in Data Storage System 24.

Figure 7:
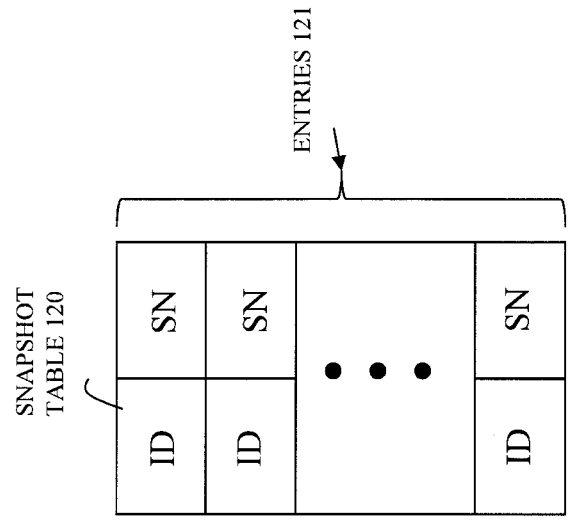
FIG. 7 is a block diagram showing an example of a snapshot table that may be used in some embodiments of the disclosed technology.

FIG. 7 shows an example of a Snapshot Table 120. Snapshot Table 120 is associated with a logical volume, and includes multiple entries. Each one of the Entries 121 in the Snapshot Table 120 corresponds to a target-less snapshot that has been created of the logical volume associated with the Snapshot Table 120. Accordingly, an entry is added to Snapshot Table 120 each time a target-less snapshot is created of the logical volume associated with Snapshot Table 120. Each of the entries includes a snapshot ID and a sequence number for the corresponding target-less snapshot. The snapshot ID may be an identifier or string that is used to identify the particular snapshot to which the entry corresponds. For example, the snapshot ID may be a text string, such as "Mar. 12, 2014, 8:00 am snapshot", that uniquely identifies and describes the target-less snapshot corresponding to the entry. Alternatively, a snapshot ID may be a unique token that is used by various software processes within the Data Storage System 24 to identify the target-less snapshot that corresponds to the entry. The sequence number for each entry in Snapshot Table 120 is set to the current value of the source device sequence number for the logical volume associated with the Snapshot Table 120 at the time the target-less snapshot corresponding to the entry is created. In some embodiments, a snapshot table such as Snapshot Table 120 is maintained for each logical volume provided by the Data Storage System 24.

FIG. 8A is a block diagram showing an example of a Source Track Sequence Number Table 130 that is associated with each logical volume in some embodiments of the disclosed technology. As shown in FIG. 8A, Source Track Sequence Number Table 130 includes multiple Entries 131. Each one of the entries contains a track number indicating a specific track within the logical volume that corresponds to the entry, and a source track sequence number for that track. In this way, Source Track Sequence Number Table 130 may be used (e.g. by one or more of DSA's 29a-29c) to maintain a source track sequence number for each track of a logical volume that is associated with Source Track Sequence Number Table 130. In some embodiments, a source track sequence number table is maintained by one or more of DSA's 29a-29c for each logical volume provided by Data Storage System 24.

During operation, the source track sequence number of each entry of Source Track Sequence Number Table 130 is updated (e.g. by one of DSA's 29a-29c) each time a pointer to data copied from the corresponding track of the associated logical volume is stored into a replication data pointer data structure (e.g. RDP Table 100 or RDP Tree 110) that represents target-less snapshots created of the associated logical volume, e.g. prior to new host data being written to the corresponding track of the associated logical volume. In some embodiments, the source track sequence number is updated to match the current value of the source device sequence number associated with the logical volume, and the difference between the old value of the source track sequence number and the current value of the source device sequence number may be stored with the pointer that is added to the replication data pointer data structure (e.g. in the same entry or node) in order to indicate the number of target-less snapshots created of the associated logical volume that share the data indicated by the pointer in the entry.

FIG. 8B is a block diagram showing an example of a Target Track Sequence Number Table 132 that is associated with each logical volume. As shown in FIG. 8B, Target Track Sequence Number Table 132 includes multiple Entries 133. Each one of the entries contains a track number indicating a specific track within the logical volume that corresponds to the entry, and a target track sequence number for that track. In this way, Target Track Sequence Number Table 132 maintains a target track sequence number for each track of a logical volume that is associated with Target Track Sequence Number Table 132. In some embodiments, a target track sequence number table is maintained for each logical volume provided by Data Storage System 24.

During operation, the target track sequence number of each entry of Target Track Sequence Number Table 130 is updated each time target-less snapshot data is moved to the corresponding track of the logical volume associated with Target Track Sequence Number Table 130. For example, after a target-less snapshot of a source logical volume is linked to a target logical volume in order to allow host access to the target-less snapshot, and a host write operation is received that is directed to a track in the target logical volume, in the event that a current value of the target track sequence number for that track is less than the current value of a target device sequence number associated with the logical volume, then the data from the corresponding track of the target-less snapshot is moved to the track of the target logical volume prior to performing the received host write operation. The data from the corresponding track of the target-less snapshot may be moved to the track of the target logical volume by either i) writing a pointer to the storage in which the data from the corresponding track of the target-less snapshot is stored into an entry corresponding to the track in a mapping table indicating the locations of physical storage that is used to store host data written to the target logical volume (e.g. Tracks Table 82), or ii) copying data from the physical storage that stores the corresponding track of the target-less snapshot to physical storage that is already indicated by an entry corresponding to the track in the mapping table indicating the locations of physical storage that is used to store host data written to the target logical volume (e.g. Tracks Table 82). The data from the corresponding track of the target-less snapshot may be located in physical storage for the corresponding track in the source logical volume the target-less snapshot was taken of, or in physical storage indicated by a pointer contained in an table entry or tree node associated with the target-less snapshot in a replication data pointer data structure that is associated with the source logical volume.

After the data is moved from the corresponding track of the target-less snapshot to the track of the target logical volume, the received write operation may be performed on the target logical volume, and the target track sequence number for the track in the target logical volume is updated. In some embodiments, the target track sequence number is updated to match the current value of the target device sequence number associated with the target logical volume.

Figures 9A, 9B:
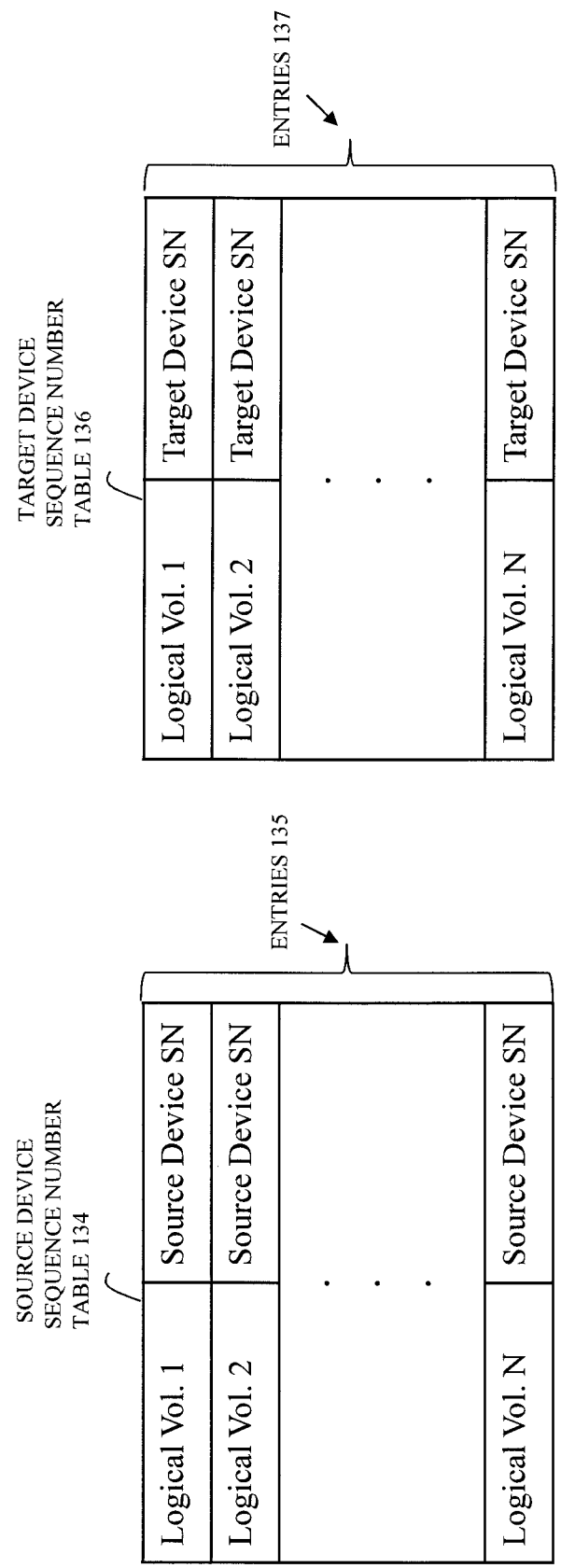
FIG. 9A is a block diagram showing an example of a source device sequence number table that may be used in some embodiments of the disclosed technology.
FIG. 9B is a block diagram showing an example of a target device sequence number table that may be used in some embodiments of the disclosed

FIG. 9A is a block diagram showing an example of a Source Device Sequence Number Table 130 that contains multiple Entries 135, and in which each entry in Entries 135 corresponds to one of the multiple logical volumes provided by Data Storage System 24. For example, Source Device Sequence Number Table 130 may include an entry for Logical Volume 1, an entry for Logical Volume 2, and so on through an entry for Logical Volume N. Each one of the entries in Source Device Sequence Number Table 134 contains a source device sequence number for the corresponding logical volume. In this way, Source Device Sequence Number Table 134 may be used, for example by one or more of DSA's 29a-29c, to maintain a source device sequence number for each logical volume provided by Data Storage System 24. During operation, the source device sequence number of an entry in Source Device Sequence Number Table 134 is incremented each time a target-less snapshot is created of the logical volume corresponding to that entry.

FIG. 9B is a block diagram showing an example of a Target Device Sequence Number Table 136 that contains multiple Entries 137, and in which each entry in Entries 137 corresponds to one of the multiple logical volumes provided by Data Storage System 24. For example, Target Device Sequence Number Table 137 may include an entry for Logical Volume 1, an entry for Logical Volume 2, and so on through an entry for Logical Volume N. Each one of the entries in Target Device Sequence Number Table 136 contains a target device sequence number for the corresponding logical volume. In this way, Target Device Sequence Number Table 136 may be used, e.g. by one or more of DSA's 29a-29c, to maintain a target device sequence number for each logical volume provided by Data Storage System 24. During operation, the target device sequence number of an entry in Target Device Sequence Number Table 136 is incremented each time a target-less snapshot is linked to the logical volume corresponding to that entry.

Figure 10B:
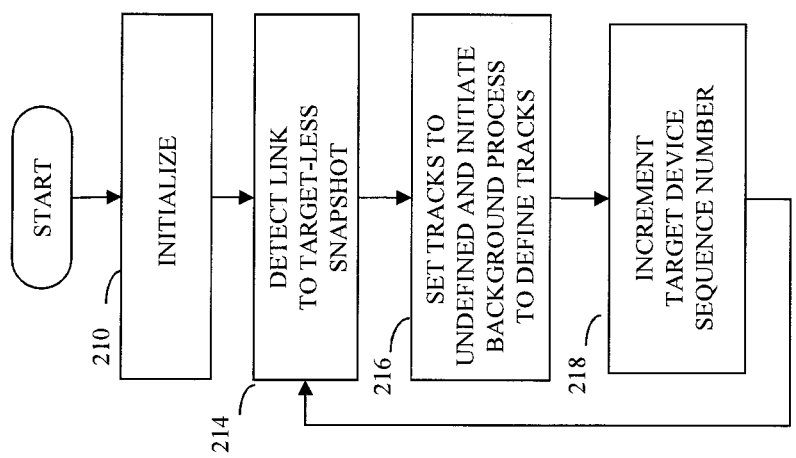
FIG. 10B is a flow diagram illustrating an example of processing performed in connection with linking target-less snapshots to a logical volume according to some embodiments of the disclosed technology.
Figure 10A:
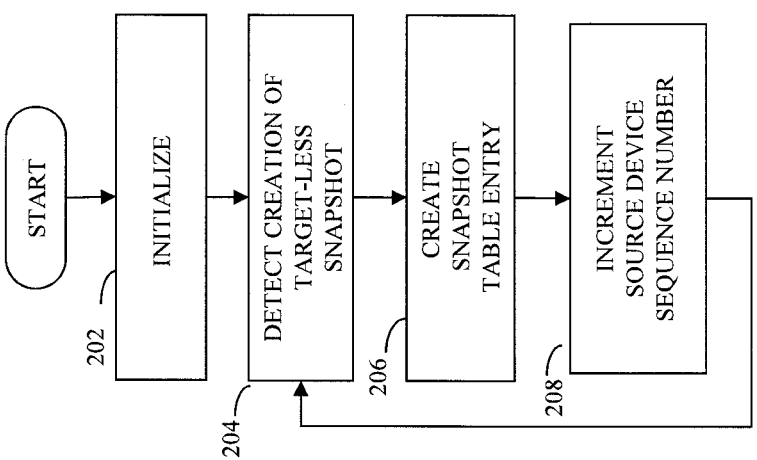
FIG. 10A is a flow diagram illustrating an example of processing performed in connection with creating target-less snapshots of a logical volume according to some embodiments of the disclosed technology.

FIG. 10A is a flow diagram illustrating an example of processing performed in connection with creating target-less snapshots for a logical volume according to some embodiments of the disclosed technology. At step 202 initialization may be performed, e.g. when the logical volume is created. Such initialization may include setting the source device sequence number for the logical volume to an initial value such as zero, and creating a snapshot table for the logical volume. At step 204 creation of a target-less snapshot of the logical volume is detected. The creation of the target-less snapshot of the logical volume may be caused by expiration of a snapshot time associated with the logical volume, which causes target-less snapshots to be created of the logical volume periodically, e.g. every hour. Alternatively, creation of the target-less snapshot of the logical volume may be caused by a snapshot request received from a host. When the target-less snapshot is initially created at step 204, it is not host accessible. In response to detecting the creation of the target-less snapshot at step 204, at step 206 an entry for the target-less snapshot is added to the snapshot table for the logical volume. The entry added at step 206 includes a snapshot ID and a sequence number for the corresponding target-less snapshot that was created at step 204. At step 208, the source device sequence number for the logical volume is incremented. For example, the sequence number for the target-less snapshot that was created at step 204 may be set equal to the source device sequence number for the logical volume after the source device sequence number for the logical volume was incremented at step 208. Each subsequent time creation of a target-less snapshot is detected at step 204, another snapshot table entry is created, and the source device sequence number for the logical volume is incremented again.

FIG. 10B is a flow diagram illustrating an example of processing performed in connection with linking target-less snapshots to a logical volume according to some embodiments of the disclosed technology. At step 210 initialization may be performed, e.g. when the logical volume is created. Such initialization may include setting the target device sequence number for the logical volume to an initial value such as zero. At step 214 linking of a target-less snapshot to the logical volume is detected. The linking of the target-less snapshot to the logical volume may, for example, be caused by a host request to access the target-less snapshot, which is not host accessible until it is linked to a logical volume. In response to detecting in step 214 that a target-less snapshot has been linked to the logical volume, at step 216 the state of all the tracks in the logical volume are set to undefined. For example, a bitmap may be maintained having a bit corresponding to each track in the logical volume, and at step 216 each bit in the bit map may be set to a value indicating that the corresponding track of the logical volume is undefined. Also at step 216 a background process is started that moves data of the target-less snapshot to the tracks of the target logical volume. The background process may move the data of each track of the target-less snapshot to each corresponding track of the target logical volume by either i) copying the data of the corresponding track of the target-less snapshot to a physical track of a storage device that is allocated to store the data written to the corresponding track of the target logical volume, or ii) setting up a pointer in a mapping table for the track of the logical volume indicating a physical track of a physical storage device on which the data written to the corresponding track of the target-less snapshot is stored. After the background process moves the data of a track of the target-less snapshot to the corresponding track of the logical volume, the background process changes the bit in the bitmap corresponding to that track of the logical volume to indicate that the track is now defined. The background process may further operate after it moves the data of a track of the target-less snapshot to the corresponding track of the logical volume by updating a target track sequence number corresponding to that track of the logical volume, e.g. to equal a current value of the target device sequence number for the logical volume.

At step 218, further in response to detecting at 214 that the logical volume was linked to a target-less snapshot, the target device sequence number for the logical volume is incremented.

Each subsequent time linking of a target-less snapshot is detected at step 214, the state of each track in the logical volume is again set to undefined and the background process is reinitiated, or continues operating to move data from the target-less snapshot to the undefined tracks of the logical volume at 216, and the target device sequence number for the logical volume is incremented again.

Figure 11:
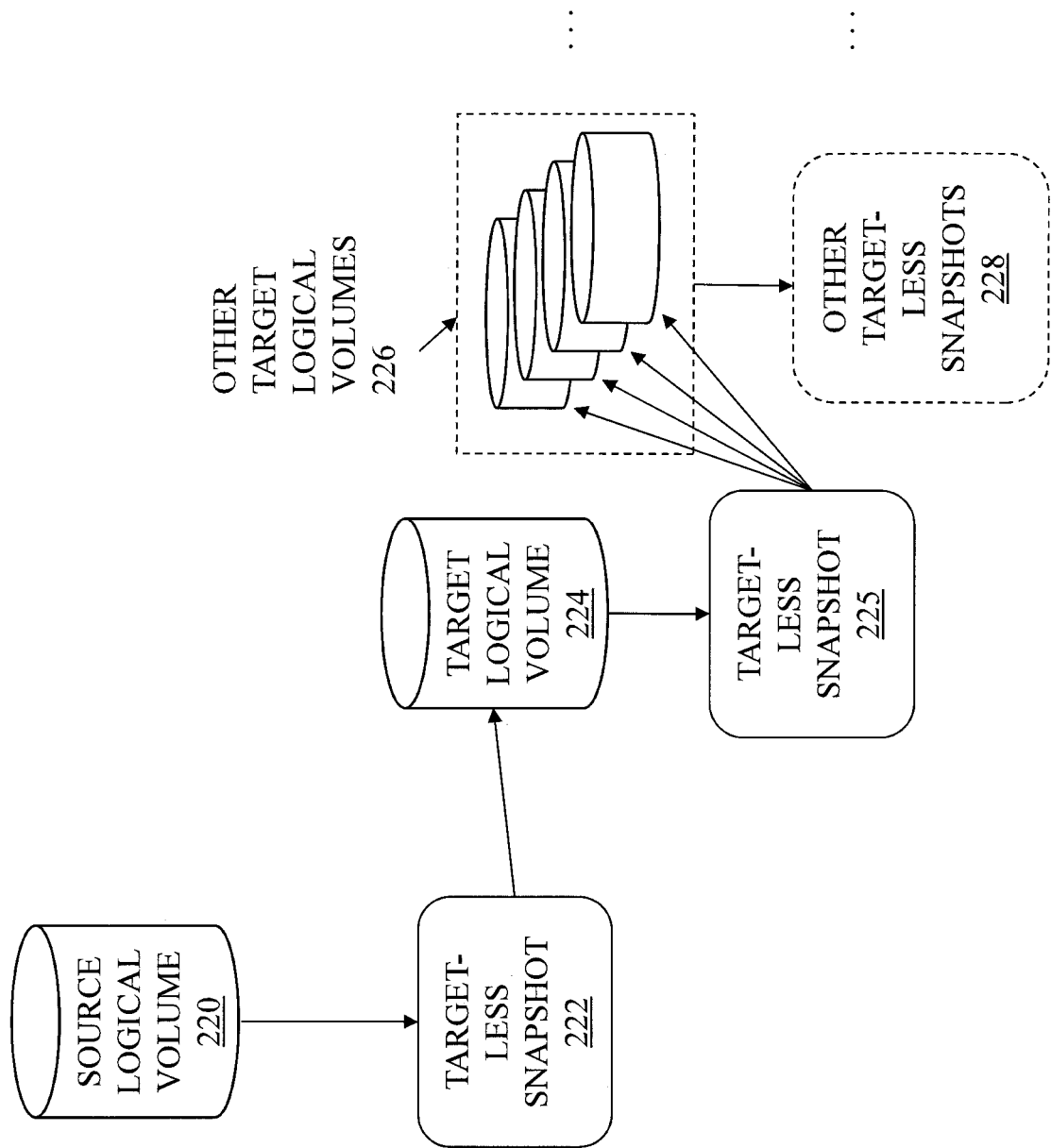
FIG. 11 is a block diagram illustrating creation of a target-less snapshot of a source logical volume, linking of the target-less snapshot of the source logical volume to a target logical volume, creation of a target-less snapshot of the target logical volume, linking of the target-less snapshot of the target logical volume to other logical volumes, and creation of other target-less snapshots of the other logical volumes according to some embodiments of the disclosed technology.

FIG. 11 is a block diagram illustrating creation of a Target-less Snapshot 222 of a Source Logical Volume 220. Immediately after it is created, the Target-Less Snapshot 222 of Source Logical Volume 220 is not host accessible. Subsequently, in response to a host request to access Target-less Snapshot 222, a link operation is performed to link Target-less Snapshot 222 to a logical volume that is host accessible, e.g. Target Logical Volume 224. After the Link Snapshot 223 operation, Target-less Snapshot 222 is host accessible through host I/O operations issued by the host and directed to Target Logical Volume 224. Host I/O operations issued to a given track of Target Logical Volume 224 are then performed with regard to data stored on the corresponding track of the Target-less Snapshot 222. Immediately after Target-less Snapshot 222 is linked to Target Logical Volume 224, all the tracks of Target Logical Volume 224 are marked as undefined, and a background process operates to define individual tracks of Target Logical Volume 224 using data from corresponding tracks of Target-less Snapshot 225. As each track of Target Logical Volume 224 is defined by the background process, it is marked as defined. Also immediately after Target-less Snapshot 222 is linked to Target Logical Volume 224, the host may issue host I/O operations to Target Logical Volume 224 in order to access Target-less Snapshot 22. The disclosed technology enables a target-less snapshot to be created of Target Logical Volume 224, shown by Target-less Snapshot 225, prior to all tracks of Target Logical Volume 224 being defined using data from corresponding tracks of Target-less Snapshot 225, and while host I/O operations are issued to Target Logical Volume 224 in order to access Target-less Snapshot 222. The disclosed technology similarly enables Target-less Snapshot 225 to be linked to Other Target Logical Volumes 226 to make Target-less Snapshot 225 host accessible, and for Other Target-less Snapshots 228 to be created on Other Target Logical Volumes 226 prior to Other Target Logical Volumes 226 being completely defined with regard to Target-less Snapshot 225. In this way the disclosed technology supports what may be referred to prompt creation of cascading target-less snapshots.

Figure 12:
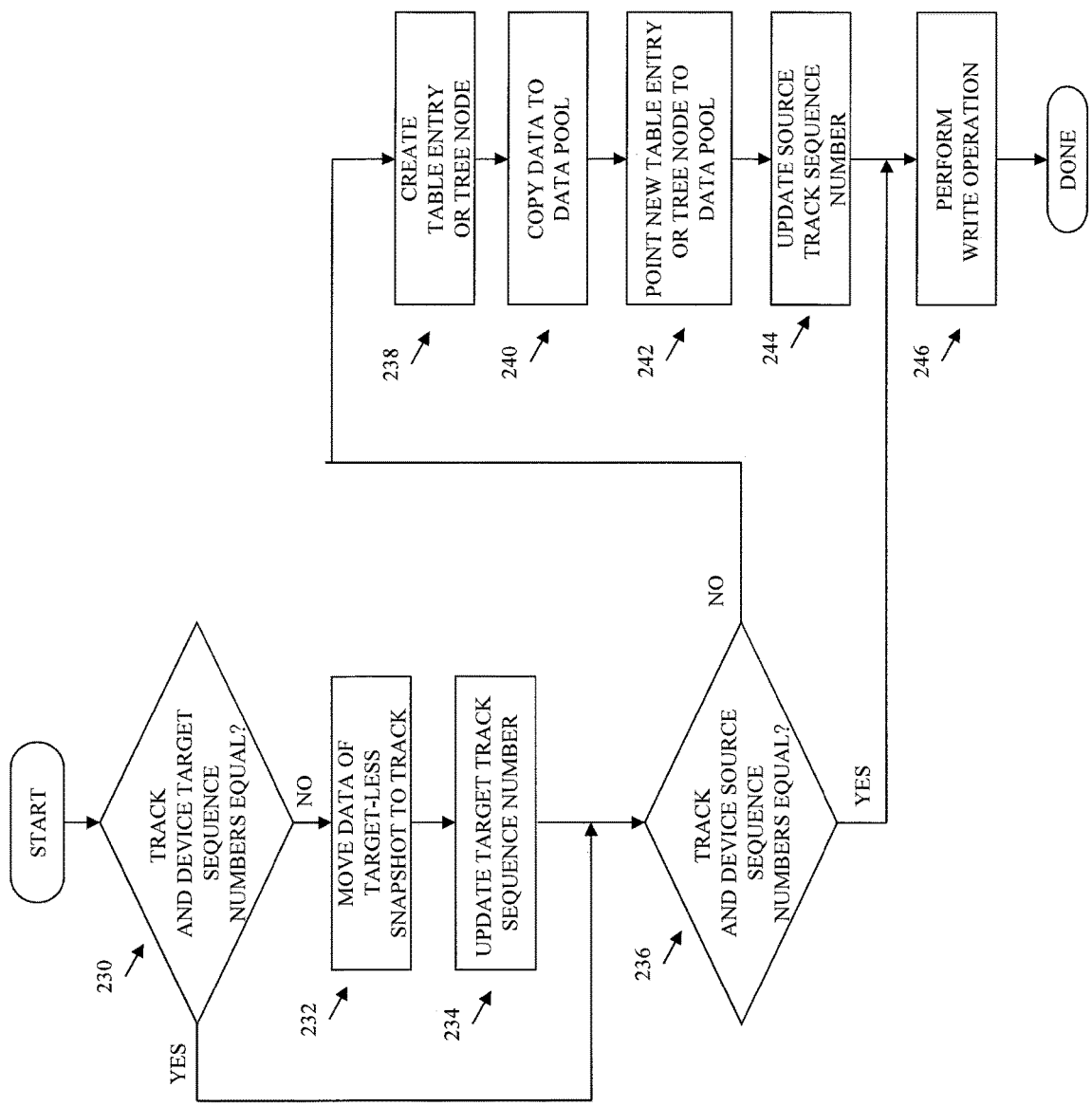
FIG. 12 is a flow chart illustrating steps performed by some embodiments of the disclosed technology to process a write I/O operation received from a host.

FIG. 12 is a flow chart illustrating steps performed by some embodiments of the disclosed technology to process a write I/O operation received from a host. The steps of FIG. 12 may, for example, be performed by one or more of the DSA's 29a-29c shown in FIG. 1, in response to receipt of a write I/O operation that is directed to a track in Target Logical Volume 224 after Target-less Snapshot 222 has been linked to Target Logical Volume 224. The steps of FIG. 12 illustrate how all write I/O operations directed to any logical volume provided by Data Storage System 24 may be processed using the disclosed technology, after the logical volume has been linked to a target-less snapshot.

At 230 the target track sequence number for the track to which the write I/O operation is directed is compared with the current value of the target device sequence number for Target Logical Volume 224. In response to the target track sequence number being equal to the target device sequence number, step 230 is followed by step 236. Otherwise, step 230 is followed by step 232.

At step 232, data of the corresponding track of Target-less Snapshot 222 is moved to the track to which the write I/O operation is directed in Target Logical Volume 224. For example, data of the corresponding track of Target-less Snapshot 222 may be moved to the track to which the write I/O operation is directed in Target Logical Volume 224 in what is referred to as "copy mode" operation by copying the data of the corresponding track of the Target-less Snapshot 222 to a physical track of a storage device that is allocated to ultimately store the data written to that track of Target Logical Volume 224. Alternatively, in what is referred to as "no-copy mode" operation, data of the corresponding track of Target-less Snapshot 222 may be moved to the track to which the write I/O operation is directed in Target Logical Volume 224 by writing a pointer that points to the data of the corresponding track of the Target-less Snapshot 222 into a mapping table for Target Logical Volume 224 that indicates where data written to that track in Target Logical Volume 224 is stored. It should be recognized that the write I/O operation may write only a subset of the total track in Target Logical Volume 224, and accordingly data of the corresponding track of Target-less Snapshot 222 must be moved to the track to which the write I/O operation is directed prior to performing the I/O operation, and prior to any copying of the data from the track to which the write I/O operation is directed in step 240 as described below. At step 234, the target track sequence number for the track in the Target Logical Volume 224 to which the write I/O operation is directed is updated, e.g. by setting the target track sequence number for the track in the Target Logical Volume 224 to which the write I/O operation is directed to the current value of the target device sequence number for Target Logical Volume 224. Step 234 is followed by step 236.

At 236 the source track sequence number for the track to which the write I/O operation is directed is compared with the current value of the source device sequence number for Target Logical Volume 224. In response to the source track sequence number being equal to the target device sequence number, step 236 is followed by step 246. Otherwise, step 236 is followed by step 238.

At step 238, the replication data pointer data structure for Target Logical Volume 224 is prepared to store a pointer to a copy of the data stored in the track to which the write I/O operation is directed. For example, in an embodiment in which the replication data pointer data structure is an RDP table as illustrated in FIG. 5A, an entry is added to the table. In an embodiment in which the replication data pointer data structure is an RDP tree as illustrated in FIG. 5B, then a node is added to the tree. At step 240, the data stored in the track to which the write I/O operation is directed is copied to a portion of the Data Pool 111. At step 242, a pointer to the location in Data Pool 111 into which the data stored in the track to which the I/O operation is directed was copied at step 240 is stored into the table entry or tree node created at step 238. At step 244, the source track sequence number for the track to which the write I/O operation is directed is updated, e.g. by setting the source track sequence number for the track to which the write I/O operation is directed to the current value of the source device sequence number for Target Logical Volume 224. Step 244 is followed by step 246, in which the write I/O operation is performed on the track in Target Logical Volume 224.

While FIG. 12 illustrates processing a write I/O operation from a host that is directed to Target Logical Volume 224 after Target-less Snapshot 222 has been linked to Target Logical Volume 224, processing of read I/O operations received from a host that are directed to a track in Target Logical Volume 224 after Target-less Snapshot 222 has been linked to Target Logical Volume 224 also will make the comparison at step 230 to determine whether the track has been defined with regard to data in the corresponding track of Target-less Snapshot 222. If the target track sequence number for the track to which the read I/O operation is directed is less than target device sequence number for Target Logical Volume 224, then data from corresponding track of Target-less Snapshot 222 must be moved to the track to which the read I/O operation is directed prior to performing the read I/O operation. After the data from the corresponding track of Target-less Snapshot 222 is moved to the track to which the read I/O operation is directed, the read I/O operation can be performed, and the target track sequence number for the track to which the read I/O operation is directed can be updated to be equal to the current value of the target device sequence number of Target Logical Volume 224.

Figure 13:
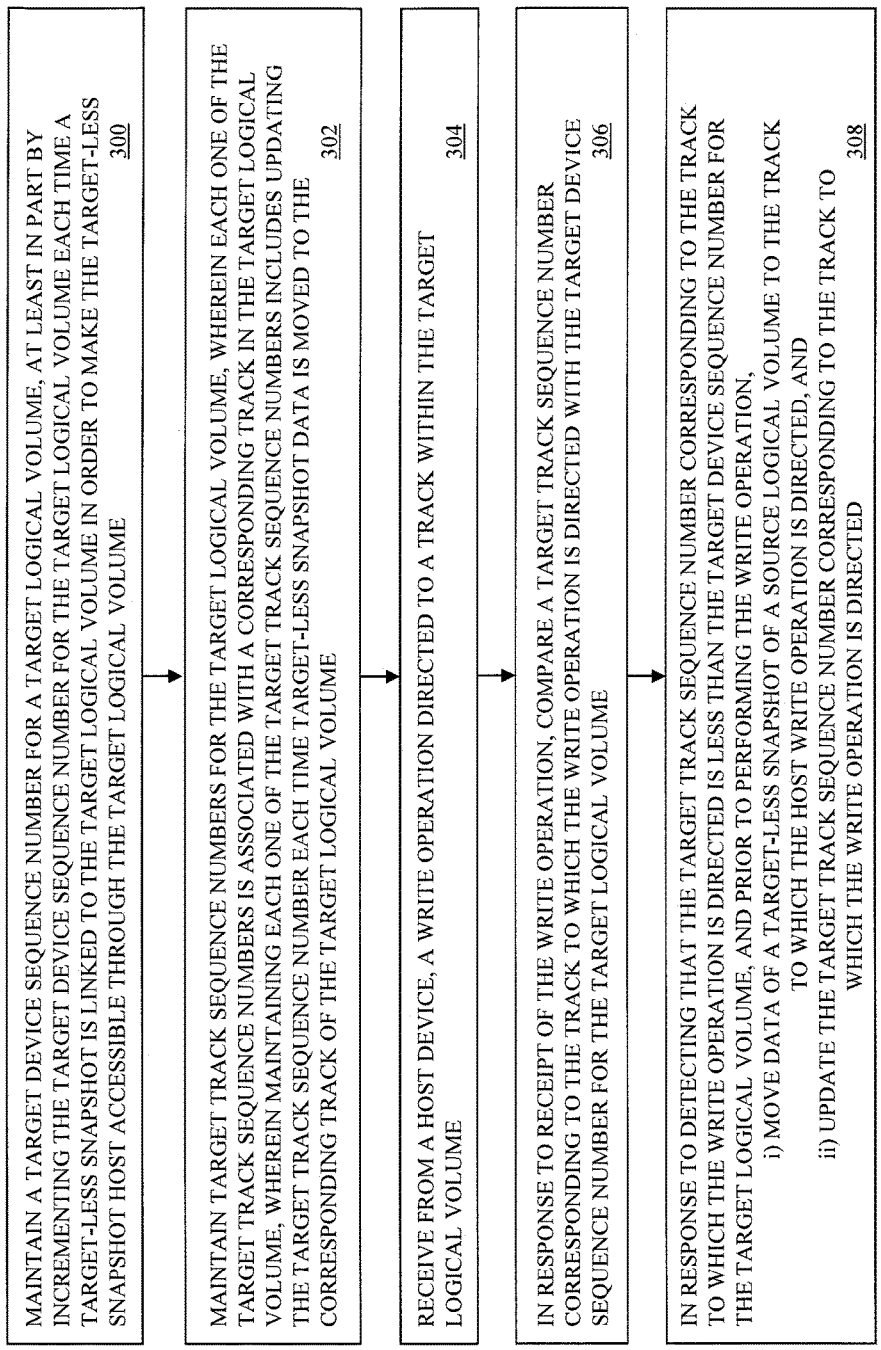
FIG. 13 is a flow chart further illustrating steps performed by some embodiments of the disclosed technology to process a write I/O operation received from a host.

FIG. 13 is a flow chart further illustrating steps performed by some embodiments of the disclosed technology in an operational example of processing a write I/O operation received from a host. The steps of FIG. 13 may, for example, be performed by one or more of the DSA's 29a-29c shown in FIG. 1. At 300, a target device sequence number is maintained for a target logical volume, at least in part by incrementing the target device sequence number for the target logical volume each time a target-less snapshot is linked to the target logical volume in order to make the target-less snapshot host accessible through the target logical volume.

At 302, target track sequence numbers are maintained for the target logical volume. Each one of the target track sequence numbers is associated with a corresponding track in the target logical volume, and maintaining each one of the target track sequence numbers includes updating the target track sequence number each time target-less snapshot data is moved to the corresponding track of the target logical volume.

At 304 a write operation directed to a track within the target logical volume is received from a host device.

At 306 in response to receipt of the write operation, a target track sequence number corresponding to the track to which the write operation is directed is compared with the target device sequence number for the target logical volume.

At 308, in response to detecting that the target track sequence number corresponding to the track to which the write operation is directed is less than the target device sequence number for the target logical volume, and prior to performing the write operation, i) data of a target-less snapshot of a source logical volume is moved to the track to which the host write operation is directed, and ii) the target track sequence number corresponding to the track to which the write operation is directed is updated.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of allowing target-less snapshots to be created of a target logical volume, comprising:

maintaining a target device sequence number for the target logical volume, at least in part by incrementing the target device sequence number for the target logical volume each time a target-less snapshot is linked to the target logical volume in order to make the target-less snapshot host accessible through the target logical volume;

maintaining a plurality of target track sequence numbers for the target logical volume, wherein each one of the target track sequence numbers is associated with a corresponding one of a plurality of tracks in the target logical volume, wherein maintaining each one of the target track sequence numbers includes updating the target track sequence number each time target-less snapshot data is moved to the corresponding track of the target logical volume;

linking a target-less snapshot of a source logical volume to the target logical volume, wherein linking the target-less snapshot of the source logical volume to the target logical volume makes the target-less snapshot of the source logical volume accessible to a host device through host operations directed to the target logical volume;

receiving, from a host device, a write operation directed to a track within the target logical volume;

in response to receipt of the write operation, comparing a target track sequence number corresponding to the track to which the write operation is directed with the target device sequence number for the target logical volume;

in response to detecting that the target track sequence number corresponding to the track to which the write operation is directed is less than the target device sequence number for the target logical volume, and prior to performing the write operation,
  i) moving data of the target-less snapshot of the source logical volume to the track to which the host write operation is directed, and
  ii) updating the target track sequence number corresponding to the track to which the write operation is directed by setting the target track sequence number corresponding to the track to which the write operation is directed to a current value of the target device sequence number for the target logical volume; and maintaining a source device sequence number for the target logical volume, by incrementing the source device sequence number for the target logical volume each time a target-less snapshot is created of the target logical volume, wherein each target-less snapshot created of the target logical volume is not host accessible at the time it is created, wherein the target logical volume is one of a plurality of logical volumes, and wherein the source device sequence number for the target logical volume stores a total number of target-less snapshots created of the target logical volume.

2. The method of claim 1, further comprising:
maintaining a plurality of source track sequence numbers for the target logical volume, wherein each one of the source track sequence numbers is associated with a corresponding one of a plurality of tracks in the target logical volume, wherein maintaining each one of the source track sequence numbers includes updating the source track sequence number each time a pointer to data copied from the corresponding track of the target logical volume is stored into a replication pointer data structure that represents target-less snapshots created of the target logical volume.

3. The method of claim 2, further comprising:
further in response to receipt of the write operation, subsequent to moving the data of the target-less snapshot of the source logical volume to the track within the target logical volume to which the host write operation is directed, comparing a source track sequence number corresponding to the track within the target logical volume to which the write operation is directed with the source device sequence number for the target logical volume;

in response to detecting that the source track sequence number corresponding to the track within the target logical volume to which the write operation is directed is less than the source device sequence number for the target logical volume, and prior to performing the host write operation,
  i) copying data from the track to which the host write operation is directed to a portion of a data pool,
  ii) storing a pointer to the portion of the data pool into a replication data pointer data structure that represents target-less snapshots created of the target logical volume, and
  iii) updating the source track sequence number corresponding to the track to which the host write operation is directed; and performing the host write operation.

4. The method of claim 3, further comprising creating the target-less snapshot of the source logical volume, wherein the target-less snapshot of the source logical volume comprises a point in time copy of the source logical volume, and wherein the target-less snapshot of the source logical volume is not host accessible at the time it is created.

5. The method of claim 4, further comprising:
incrementing the target device sequence number for the target logical volume in response to linking the target-less snapshot of the source logical volume to the target logical volume.

6. The method of claim 5, further comprising:
in response to linking the target-less snapshot of the source logical volume to the target logical volume, causing a background process to begin moving data of the target-less snapshot of the source logical volume to the tracks of the target logical volume;

subsequent to the linking of the target-less snapshot of the source logical volume to the target logical volume, and prior to the background process copying data of the target-less snapshot of the source logical volume to all the tracks of the target logical volume, creating a target-less snapshot of the target logical volume that is a point in time copy of the target logical volume; and incrementing the source device sequence number for the target logical volume in response to the target-less snapshot of the target logical volume being created.

7. The method of claim 6, wherein the background process updates the target track sequence number corresponding to each track in the target logical volume to which it copies data of the target-less snapshot of the source logical volume.

8. The method of claim 1, wherein moving data of the target-less snapshot of the source logical volume to the track to which the host write operation is directed comprises copying data of the target-less snapshot of the source logical volume to the track to which the host write operation is directed in the target logical volume.

9. The method of claim 1, wherein moving data of the target-less snapshot of the source logical volume to the track to which the host write operation is directed comprises writing a pointer to the data of the target-less snapshot of the source logical volume to an entry associated with the track to which the host write operation is directed in a mapping table associated with the target logical volume.

10. A data storage system, comprising:
processing circuitry;
at least one non-volatile data storage device for storing host data;
a memory having program code stored thereon for allowing target-less snapshots to be created of a target logical volume, wherein the program code, when executed by the processing circuitry, causes the processing circuitry to:
maintain a target device sequence number for the target logical volume, at least in part by incrementing the target device sequence number for the target logical volume each time a target-less snapshot is linked to the target logical volume in order to make the target-less snapshot host accessible through the target logical volume, maintain a plurality of target track sequence numbers for the target logical volume, wherein each one of the target track sequence numbers is associated with a corresponding one of a plurality of tracks in the target logical volume, wherein each one of the target track sequence numbers is maintained at least in part by updating the target track sequence number each time target-less snapshot data is moved to the corresponding track of the target logical volume, link a target-less snapshot of a source logical volume to the target logical volume, wherein linking the target-less snapshot of the source logical volume to the target logical volume makes the target-less snapshot of the source logical volume accessible to a host device through host operations directed to the target logical volume, receive, from a host device, a write operation directed to a track within the target logical volume, in response to receipt of the write operation, compare a target track sequence number corresponding to the track to which the write operation is directed with the target device sequence number for the target logical volume, in response to detecting that the target track sequence number corresponding to the track to which the write operation is directed is less than the target device sequence number for the target logical volume, and prior to performing the write operation:
  i) move data of the target-less snapshot of the source logical volume to the track to which the host write operation is directed, and
  ii) update the target track sequence number corresponding to the track to which the write operation is directed by setting the target track sequence number corresponding to the track to which the write operation is directed to a current value of the target device sequence number for the target logical volume, and maintain a source device sequence number for the target logical volume, by incrementing the source device sequence number for the target logical volume each time a target-less snapshot is created of the target logical volume, wherein each target-less snapshot created of the target logical volume is not host accessible at the time it is created, wherein the target logical volume is one of a plurality of logical volumes, and wherein the source device sequence number for the target logical volume stores a total number of target-less snapshots created of the target logical volume.

11. The data storage system of claim 10, wherein the program code, when executed by the processing circuitry, further causes the processing circuitry to:

maintain a plurality of source track sequence numbers for the target logical volume, wherein each one of the source track sequence numbers is associated with a corresponding one of a plurality of tracks in the target logical volume, wherein each one of the source track sequence numbers is maintained at least in part by updating the source track sequence number each time a pointer to data copied from the corresponding track of the target logical volume is stored into a replication pointer data structure that represents target-less snapshots created of the target logical volume.

12. The data storage system of claim 11, wherein the program code, when executed by the processing circuitry, further causes the processing circuitry to:

further in response to receipt of the write operation, subsequent to moving the data of the target-less snapshot of the source logical volume to the track within the target logical volume to which the host write operation is directed, compare a source track sequence number corresponding to the track within the target logical volume to which the write operation is directed with the source device sequence number for the target logical volume;

in response to detecting that the source track sequence number corresponding to the track within the target logical volume to which the write operation is directed is less than the source device sequence number for the target logical volume, and prior to performing the host write operation,
  i) copy data from the track to which the host write operation is directed to a portion of a data pool,
  ii) store a pointer to the portion of the data pool into a replication data pointer data structure that represents target-less snapshots created of the target logical volume, and
  iii) update the source track sequence number corresponding to the track to which the host write operation is directed; and perform the host write operation.

13. The data storage system of claim 12, wherein the program code, when executed by the processing circuitry, further causes the processing circuitry to create the target-less snapshot of the source logical volume, wherein the target-less snapshot of the source logical volume comprises a point in time copy of the source logical volume, and wherein the target-less snapshot of the source logical volume is not host accessible at the time it is created.

14. The data storage system of claim 13, wherein the program code, when executed by the processing circuitry, further causes the processing circuitry to:

increment the target device sequence number for the target logical volume in response to the target-less snapshot of the source logical volume being linked to the target logical volume.

15. The data storage system of claim 14, wherein the program code, when executed by the processing circuitry, further causes the processing circuitry to:

in response to linking the target-less snapshot of the source logical volume to the target logical volume, cause a background process to begin moving data of the target-less snapshot of the source logical volume to the tracks of the target logical volume;

subsequent to the linking of the target-less snapshot of the source logical volume to the target logical volume, and prior to the background process copying data of the target-less snapshot of the source logical volume to all the tracks of the target logical volume, create a target-less snapshot of the target logical volume that is a point in time copy of the target logical volume; and increment the source device sequence number for the target logical volume in response to the target-less snapshot of the target logical volume being created.

16. The data storage system of claim 15, wherein the program code, when executed by the processing circuitry, further causes the processing circuitry to:

update, by the background process, the target track sequence number corresponding to each track in the target logical volume to which it copies data of the target-less snapshot of the source logical volume.

17. The data storage system of claim 10, wherein the program code, when executed by the processing circuitry, further causes the processing circuitry to move data of the target-less snapshot of the source logical volume to the track to which the host write operation is directed at least in part by copying data of the target-less snapshot of the source logical volume to the track to which the host write operation is directed in the target logical volume.

18. The data storage system of claim 10, wherein the program code, when executed by the processing circuitry, further causes the processing circuitry to move data of the target-less snapshot of the source logical volume to the track to which the host write operation is directed at least in part by writing a pointer to the data of the target-less snapshot of the source logical volume to an entry associated with the track to which the host write operation is directed in a mapping table associated with the target logical volume.

19. A computer program product, comprising:
 a non-transitory computer readable medium storing program code for allowing target-less snapshots to be created of a target logical volume, the set of instructions, when carried out by at least one processor, causing the processor to perform a method of:
  maintaining a target device sequence number for the target logical volume, at least in part by incrementing the target device sequence number for the target logical volume each time a target-less snapshot is linked to the target logical volume in order to make the target-less snapshot host accessible through the target logical volume;
  maintaining a plurality of target track sequence numbers for the target logical volume, wherein each one of the target track sequence numbers is associated with a corresponding one of a plurality of tracks in the target logical volume, wherein maintaining each one of the target track sequence numbers includes updating the target track sequence number each time target-less snapshot data is moved to the corresponding track of the target logical volume;
  linking a target-less snapshot of a source logical volume to the target logical volume, wherein linking the target-less snapshot of the source logical volume to the target logical volume makes the target-less snapshot of the source logical volume accessible to a host device through host operations directed to the target logical volume;
  receiving, from a host device, a write operation directed to a track within the target logical volume;
  in response to receipt of the write operation, comparing a target track sequence number corresponding to the track to which the write operation is directed with the target device sequence number for the target logical volume;
  in response to detecting that the target track sequence number corresponding to the track to which the write operation is directed is less than the target device sequence number for the target logical volume, and prior to performing the write operation,
   i) moving data of the target-less snapshot of the source logical volume to the track to which the host write operation is directed, and
   ii) updating the target track sequence number corresponding to the track to which the write operation is directed by setting the target track sequence number corresponding to the track to which the write operation is directed to a current value of the target device sequence number for the target logical volume; and
  maintaining a source device sequence number for the target logical volume, by incrementing the source device sequence number for the target logical volume each time a target-less snapshot is created of the target logical volume, wherein each target-less snapshot created of the target logical volume is not host accessible at the time it is created, wherein the target logical volume is one of a plurality of logical volumes, and wherein the source device sequence number for the target logical volume stores a total number of target-less snapshots created of the target logical volume.

20. The method of claim 1, further comprising:
 maintaining a snapshot table for the target logical volume, by adding an entry to the snapshot table for the target logical volume each time a target-less snapshot is created of the target logical volume, wherein the entry contains a snapshot identifier and a sequence number for the target-less snapshot created of the target logical volume, and wherein the snapshot table for the target logical volume stores an entry for each target-less snapshot that is created of the target logical volume.

* * * * *